| United States Patent [19] | [11] | 4,315,038 |
|---|---|---|
| Townsley et al. | [45] | Feb. 9, 1982 |

[54] PROCESS FOR PREPARING PROTEIN FLOUR FROM BREWERY WASTE

[75] Inventors: Phillip M. Townsley, Vancouver; Robert L. Weaver, Montreal West, both of Canada

[73] Assignee: The Molson Companies Limited, Rexdale, Canada

[21] Appl. No.: 179,820

[22] Filed: Aug. 20, 1980

[30] Foreign Application Priority Data

Sep. 4, 1979 [CA] Canada .................................. 334936

[51] Int. Cl.³ .......................... A23L 1/10; A23K 1/06; A23J 1/12
[52] U.S. Cl. .................................... 426/430; 426/429; 426/622; 426/624; 426/627; 426/655; 426/656; 426/472; 426/495; 426/489
[58] Field of Search ............... 426/430, 426, 429, 624, 426/655, 656, 600, 627, 618, 622, 490, 495, 472, 489

[56] References Cited

U.S. PATENT DOCUMENTS 2,524,718 10/1950 Stark et al. ........................... 426/430
2,530,594 11/1950 Benedict ............................. 426/495

OTHER PUBLICATIONS

Feeds & Feeding, Morrison, Morrison Publ. Co., 22nd ed., 1957, pp. 450, 451.
Alcoholic Beverages, Rose, vol. I, 1977, Academic Press, pp. 80, 81.
The Handbook of Feedstuffs, Seiden, 1957, Springer Publ. Co., p. 66.

Primary Examiner—Steven L. Weinstein
Attorney, Agent, or Firm—Anthony J. Casella

[57] ABSTRACT

Trub obtained from the wort kettle of a brewing system is rich in protein and thus can be used in human foods. The trub is processed to yield a trub flour by extraction with an azeotropic mixture of isopropanol and water, and drying to remove the solvent in a roller drum drier, the latter yielding the trub flour in dry flake form.

6 Claims, No Drawings

PROCESS FOR PREPARING PROTEIN FLOUR FROM BREWERY WASTE

This invention relates to a process for utilizing brewery waste and in particular to a process for preparing a flour which can be used in the preparation of foodstuffs.

Conventional processes for the brewing of beer produce large quantities of waste materials, some of which are rich in protein. One such material is trub, which is obtained from whirlpool extraction of the residue remaining in the wort kettle used in the brewing process. The trub obtained from a wort kettle is a highly proteinaceous matter. Obviously, it would be desirable to be able to use the trub in the production of human food.

The object of the present invention is to provide a process for preparing a flour from the trub which can be used in the preparation of human food.

Accordingly, the invention relates to a process for preparing a flour for human food comprising the steps of extracting solid trub with an isopropanolic solvent to remove water and trub resin from the trub, and drying the trub to yield a trub flour.

More specifically, the residue from a wort kettle is subjected to whirlpool separation to yield usable wort and trub. The trub is pressed to yield additional wort. A considerable quantity of wort can be recovered from hot break trub following removal of the trub from the whirlpool separator. Much of the wort can be recovered by simple pressing. For example, with a sample of 6,000 lbs dry weight of trub, at least 1064 gallons and possibly as much as 2,000 gallons of wort can be recovered.

Water is then removed from the trub by isopropanolic extraction using an azeotropic isopropanol. The solvent wet trub is passed through a roller drum drier to yield dry trub in flake form. The additional solvent recovered from the drier is vaporized and recovered in the same condenser used to condense the distilled solvent. The solvent, after separation of the trub, contains hop resins. The crude resins are subjected to evaporation to yield solvent and a crude resin extract, which is subjected to isopropanolic extraction to yield a fraction insoluble in alcohol and a trub resin extract. The trub resin extract, after separation from the solvent by evaporation, can be used in ale fermentation.

Waste brewer's grain can be used in a similar manner to produce flour for use in human food. The waste brewer's grain is fractionated by simple physical separation techniques into a protein flour suitable for human food and a husk containing material suitable for animal feed.

As set out above the residue from the wort kettles is treated in accordance with the following flow chart:

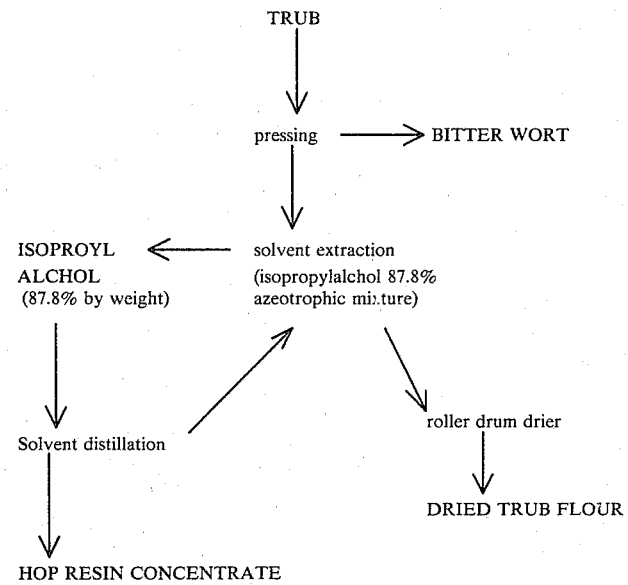

Water is removed with the solvent to yield a trub flour containing only 7.4% water after three batch extractions. Therefore, wet trub, after the removal of free wort by pressing, can be made substantially moisture-free by using an azeotropic isopropanol solvent on a continuous extraction basis. The results of a solvent extraction of wet trub are given in Table 1.

TABLE 1

| Trub Fraction | % Dry Wt. | % Water |
|---|---|---|
| Crude pressed trub | 26.85 | 73.15 |
| After first extraction | 85.70 | 14.30 |
| After second extraction | 92.50 | 7.50 |
| After third extraction | 92.60 | 7.40 |

After solvent extraction, the solvent and the hop resins contained therein are recovered by distillation of the solvent, which is recycled to the next wet pressed trub charge. For a 12.2% water-87.8% isopropanol azeotrope, the boiling point is 80.4° C. Additional solvent occluded to the trub recovered by passing the solvent wet trub through a roller drum drier. The solvent is vaporized and recovered in the condenser used to condense the distilled solvent. The dry trub leaves the drum drier in flake form. The same drum drying unit can be used to flake spent grain protein.

As mentioned hereinbefore, the solvent extraction removes water and, at the same time, crude hop resins. Table 2 provides an indication of the yield of crude resin during solvent extraction.

TABLE 2

| Solvent Ratio (isopropanol: pressed trub, cc:g) | Yield (g crude resin/500g trub) |
|---|---|
| 1:1 | 58.16 |
| 2:1 | 62.01 |
| 3:1 | 60.61 |

It is reasonable to conclude that 7 to 9 batch extractions are required to reduce the level of resin to within 0.1% of the initial level. The azeotropic mixture of isopropanol and water is an efficient resin extracting solvent.

Using the above described method, the yield of trub protein flour expressed as a percentage of wet trub was 23.35% (mean value of 30 evaluations during one year). The dry weight of the flour is equilibrium with room air was 89.65%. The protein content of the flour was 49.65% (55.38% protein based on dry trub).

The amino acid composition of the trub protein flour is listed in Table 3.

TABLE 3

| Amino Acid | g. amino acid/16 g N | No. Samples |
|---|---|---|
| Aspartic acid and asparagine | 8.81 | 4 |
| Threonine | 4.21 | 4 |
| Serine | 4.88 | 4 |
| Glutamic acid & Glutamine | 19.43 | 4 |
| Proline | 13.27 | 4 |
| Glycine | 4.41 | 4 |
| Alanine | 6.45 | 4 |
| Valine | 4.79 | 3 |
| Methionine | 1.60 | 4 |
| Isoleucine | 3.14 | 4 |
| Leucine | 6.69 | 4 |
| Tyrosine | 3.50 | 4 |
| Phenylalanine | 4.15 | 4 |
| Lysine | 2.81 | 4 |
| Histidine | 1.69 | 4 |
| Cystine & Cysteine | 2.97 | 4 |
| Tryptophan | 0.42 | 1 |
| Arginine | 5.01 | 3 |
| Ammonia | 3.78 | 4 |

Table 4 provides a comparison of the amino acid composition of trub protein flour with those of barley, wheat, soybean and rapeseed.

TABLE 4

| | Trub Flour | Selkirk Wheat* | Barley 6-Row* | Soybean | Rapeseed |
|---|---|---|---|---|---|
| Tryptophan | 0.42 | 1.53 | 1.42 | 1.78 | 1.66 |
| Lysine | 2.81 | 2.32 | 3.47 | 6.13 | 5.86 |
| Histidine | 1.69 | 2.21 | 2.13 | 2.72 | 2.67 |
| Ammonia | 3.78 | 3.57 | 2.83 | 1.68 | 2.10 |
| Arginine | 5.01 | 3.98 | 4.37 | 6.75 | 6.16 |
| Aspartic Acid | 8.81 | 4.67 | 6.11 | 11.33 | 7.34 |
| Threonine | 4.21 | 2.77 | 3.52 | 3.54 | 4.35 |
| Serine | 4.88 | 5.01 | 4.24 | 4.64 | 4.42 |
| Glutamic Acid | 19.43 | 33.12 | 24.48 | 18.08 | 18.08 |
| Proline | 13.27 | 11.14 | 10.94 | 5.14 | 6.13 |
| Glycine | 4.41 | 3.76 | 4.19 | 4.21 | 5.02 |
| Alanine | 6.45 | 3.26 | 4.06 | 4.18 | 4.34 |
| Cystine | 2.97 | 2.59 | 2.48 | 2.06 | 2.74 |
| Valine | 4.79 | 4.46 | 5.44 | 5.33 | 5.42 |
| Methionine | 1.60 | 1.68 | 1.60 | 1.29 | 2.11 |
| Isoleucine | 3.14 | 3.82 | 3.82 | 4.74 | 4.34 |
| Leucine | 6.69 | 6.72 | 6.94 | 7.04 | 6.77 |
| Tyrosine | 3.50 | 2.67 | 2.53 | 3.04 | 2.59 |
| Phenylalanine | 4.15 | 4.79 | 5.07 | 4.61 | 3.90 |

N.B. All values in grams of amino acid / 16 grams N.
*Tkachuk, R. and Irvine, G.N. 1969. Cereal Chem. 46, 206

Table 5 provides a comparison of the essential amino acid contents of the various protein sources as a percentage of the corresponding amino acid of standard egg protein.

TABLE 5

| Amino Acid | Trub Protein | Wheat | Barley | Soybean | Rapeseed |
|---|---|---|---|---|---|
| Isoleucine | 49.94 | 60.75 | 60.75 | 75.38 | 69.02 |
| Leucine | 75.88 | 76.23 | 78.72 | 79.85 | 76.79 |
| Lysine | 40.28 | 33.26* | 49.74* | 87.87 | 66.47* |
| Methionine | 47.62 | 50.00 | 47.62 | 38.39* | 62.80 |
| Cystine & Cysteine | 122.12 | 106.50 | 101.97 | 84.70 | 112.66 |
| Phenylalanine | 72.45 | 83.62 | 88.51 | 80.48 | 68.09 |
| Tyrosine | 84.13 | 64.18 | 60.82 | 73.08 | 62.26 |
| Threonine | 82.23 | 54.10 | 68.75 | 69.14 | 84.96 |
| Tryptophane | 28.23* | 102.82 | 95.43 | 119.62 | 111.56 |
| Valine | 69.95 | 65.13 | 79.44 | 77.83 | 79.15 |
| Arginine | 82.19 | 65.29 | 71.69 | 110.73 | 101.05 |
| Histidine | 69.49 | 90.87 | 87.58 | 111.84 | 109.79 |

*Limiting Amino Acid

A mathematical evaluation, indicates that the nutritional status of trub protein as compared to the other protein sources is good (Table 6).

TABLE 6

| Protein Source | Essential Amino Acid Index |
|---|---|
| Trub | 0.55 |
| Wheat | 0.63 |
| Barley | 0.69 |
| Soybean | 0.75 |
| Rapeseed | 0.76 |

Trub protein contains all of the amino acids normally found in cereal proteins (Table 4). However, the trub protein is unique in that the cysteine (cystine) level is high (122% of that found in egg white protein). The sulfur amino acid level in trub is higher than that found in cereals such as wheat or barley or in seeds such as soybean or rapeseed. The nutritional value of trub protein as indicated by the essential amino acid index is 0.55 which is a value slightly lower than wheat or barley which have an index of 0.63 and 0.69 respectively. The first amino acid to be limiting in a diet utilizing trub protein as the sole source of essential amino acids would be tryptophan, followed by lysine and methionine. The limiting concentrations of methionine in trub protein would be overcome by the encouragingly high concentrations of cysteine. Threonine and arginine occur at comparatively high levels in trub protein.

The solubility of trub protein in water is approximately 2 to 2½% over the pH range of 2 to 11 (Table 7). When the pH of the trub in water suspension is adjusted to 12, the solubility of the protein is only 17%. The addition of NaCl to the water does not increase the solubility of the protein. Since many food applications require that the protein be soluble in order to take advantage of the functional properties of the proteins, trub protein in its present form appears to have limited application. On the other hand, because of its nutritional value, trub can be used with advantage as an additive in products such as cookies, buns and pasta. Table 7 which follows gives the nitrogen solubility profile of trub protein flour, freeze dried trub and trub protein flour in 1 M NaCl solution (soluble protein/100 g of protein.)

TABLE 7

| Ph of protein-water-solution | Trub Protein Flour (49.65% protein) | Freeze Dried Crude Trub (52.99% protein) | Trub Protein Flour in 1M NaCl (49.65% protein) |
|---|---|---|---|
| | % protein (6.25 × N) in solution | | |
| 2 | 2.52 (average of two runs) | 2.87 | 2.21 |
| 3 | 1.93 | 2.47 | 2.14 |
| 4.5 | 1.93 | 2.76 | 2.36 |
| 7 | 2.56 | 2.83 | 2.69 |
| 8.5 | 2.28 | 2.99 | 2.21 |
| 10 | 2.87 | 3.65 | 2.53 |
| 11 | 4.09 | 4.53 | 3.13 |
| 12 | 16.64 | 7.11 | 11.46 |

Table 8 provides an indication of the ability of trub to emulsify vegetable oil. On a slight basis trub protein is able to emulsify two-thirds as much oil as say protein flour. The trub flour-oil emulsion is stable for only a very short time (possibly less than 15 seconds). Nevertheless, the performance of trub flour in vegetable oil emulsifying tests suggest that the system is not incompatible, and may be used under some circumstances.

TABLE 8

| Sample | % Protein | Corn Oil Emulsified (m/g sample) |
|---|---|---|
| Trub Protein Flour | 49.65 | 106.0 |
| Soy Protein Flour (defatted) | 60.87 | 152.9 |
| Soy Protein Isolate | 90.21 | 247.8 |
| Water-Dispersible Trub Fraction | 2.36 | 97.3 |

As demonstrated in Table 9, the water holding capacity of trub protein flour is good, being approximately 2.3 times greater than that of say flour and 0.7 times that of say protein isolate.

TABLE 9

| Sample | g H$_2$O/g protein |
|---|---|
| Trub Protein Flour | 5.88 |
| Soy Protein Flour (defatted) | 2.55 |
| Soy Protein Isolate | 8.25 |

The colour of the trub protein flour presents a problem. The dry flour is a pleasant light tan colour, but in the presence of water becomes much darker. Food products requiring a light colour for consumer acceptance could not contain trub flour as an ingredient because of its darkening effect.

Trub flour can be used to increase the nutritional value, especially in terms of sulfur amino acid, of dark coloured bakery and cereal products. Products such as bran muffins and cookies containing trub are good. The nutritional value and possibly the flavour of pasta products can be improved using trub flour. However, the products are much darker (tan coloured) than the traditional food. The number of acceptable food products that can be made from trub protein is restricted for one or more of insolubility, colour, neutral or slightly undesirable flavour and poor foam capability (ale). Another problem encountered with trub flour is in baking. During baking, the volatile aromatics of the flour entering the baking area are not as pleasant as those of wheat flours. The negative attribute is not noted in the finished bakery products.

The trub resin obtained by distillation of the isopropanolic solvent was incorporated into a "home brew" ale by following a modified home brew recipe. Bitterness values of the beer were obtained by measuring the absorbance of an iso-octane extract of the acidified beer according to standard procedures for expressing European bitterness units. The wort was prepared using 55 g of Dark John Bull malt extract and 55 g of invert sugar per liter. The resulting wort was divided into 3 batches. 3 g/liter of Northern Brewers Hop was added to the first batch, 1 g/liter of the trub resin was added to the second batch and the third batch was left unmodified. All three worts were boiled for 1 hour, with water lost by evaporation being replenished. The spent hops were removed from the wort samples. The three boiled worts were then cooled to 30° C. and pitched with ale yeast. Fermentation was completed in three days at room temperature. The beer from the three batches was then clarified, and the ales containing hop resin and trub resin adjusted to 20 European bitter units by blending with the unhopped ale.

The fermentation of the trub resin and hop resin worts appeared to be normal except for one noticeable feature. In the presence of the trub resin, the ale did not form the surface foam characteristic of active ale fermentation.

Taste trials were conducted to determine the differences in bitterness between beer made from fresh hops (reference sample) and beer made from either 100% trub resins or 50% trub resin adjusted to the same level of analytical bitterness as the reference sample. The tests revealed that the bitterness choice was due to chance. An examination of a degassed ale brew made from trub resin indicated that the bitterness contributed by the resin is similar to that contributed by natural hop flower addition to wort. No other contribution of the trub resin to the ale was measured. Obviously, the absence of foam on the trub resin beer during fermentation would alter flavour, yeast biochemistry, physical behaviour and chemical composition of the brew.

A variety of cookies, muffins and breads were made using the trub flour. On the whole, the products were found to be acceptable, and as good or better in quality than presently available products.

In summary, trub can be used to prepare a resin extract and a protein flour. The resin extract can be used to better beer. The resin-free protein flour can be employed as a source of protein for use in foodstuffs. In spite of the colour and flavour limitations, the brewery waste protein flour of the present invention can be used successfully in the production of breakfast cereals, or in combination with or as a partial replacement for flour in any products made with dark flour such as rye flour, or using molasses or spices such as cinnamon, nutmeg, ginger, cloves and allspice.

We claim:

1. A process for preparing a flour for use in human food comprising the steps of extracting solid trub with an isopropanolic solvent to remove water and trub resin from the trub, and drying the trub to yield a trub flour.

2. A process according to claim 1, wherein said isopropanolic solvent is an azeotropic mixture of isopropyl alcohol and water.

3. A process according to claim 2, wherein said azeotropic mixture contains 87.8% isopropyl alcohol and 12.2% water.

4. A process according to claim 1, 2 or 3, wherein the trub flour from the extraction is dried in a roller drum drier to yield a dried trub flour in flake form.

5. A process according to claim 1, 2 or 3, wherein, prior to the extraction step, wet trub from a wort kettle is subjected to whirlpool separation to yield trub and wort, and the trub is subjected to pressing to yield additional wort and solid trub.

6. A process according to claim 1, 2 or 3, wherein, following extraction, the trub resin is separated from the solvent.

* * * * *